United States Patent
Kelly

(10) Patent No.: US 12,042,447 B2
(45) Date of Patent: Jul. 23, 2024

(54) WHEELCHAIR WITH DYNAMIC OCCUPANT-TILT FEATURE

(71) Applicant: CHRISTIANA CARE HEALTH SYSTEM, INC., Wilmington, DE (US)

(72) Inventor: Catharine E. Kelly, Landenberg, PA (US)

(73) Assignee: CHRISTIANA CARE HEALTH SYSTEM, INC., Wilmington, DE (US)

( * ) Notice: Subject to any disclaimer, the term of this patent is extended or adjusted under 35 U.S.C. 154(b) by 0 days.

(21) Appl. No.: 18/201,811

(22) Filed: May 25, 2023

(65) Prior Publication Data

US 2023/0293367 A1 Sep. 21, 2023

Related U.S. Application Data

(63) Continuation of application No. 17/037,014, filed on Sep. 29, 2020, now Pat. No. 11,712,382.

(60) Provisional application No. 62/908,992, filed on Oct. 1, 2019.

(51) Int. Cl.
| | |
|---|---|
| *A61G 5/10* | (2006.01) |
| *A47C 1/024* | (2006.01) |
| *A47C 1/025* | (2006.01) |
| *F16H 19/04* | (2006.01) |

(52) U.S. Cl.
CPC .......... *A61G 5/1075* (2013.01); *A47C 1/0242* (2013.01); *A47C 1/025* (2013.01); *F16H 19/04* (2013.01)

(58) Field of Classification Search
CPC .... A61G 5/1075; A47C 1/0242; A47C 1/025; F16H 19/04
See application file for complete search history.

(56) References Cited

U.S. PATENT DOCUMENTS

| | | |
|---|---|---|
| 2,195,428 A | 4/1940 | Searing |
| 3,964,786 A * | 6/1976 | Mashuda ............... A61G 5/006 297/DIG. 10 |
| 4,192,549 A | 3/1980 | Petersen |
| (Continued) | | |

FOREIGN PATENT DOCUMENTS

WO WO-2023163939 A * 8/2020

OTHER PUBLICATIONS

"Stealth Power Tilts on Manual Tilt Chair." YouTube, uploaded by StealthProducts, May 6, 2011, www.youtube.com/watch?v=xRYT45cynYw.

(Continued)

*Primary Examiner* — Milton Nelson, Jr.
(74) *Attorney, Agent, or Firm* — FisherBroyles LLP

(57) ABSTRACT

A wheelchair having a tiltable occupant-support assembly, a powered drive system for adjusting the degree of tilt, and a control system for varying the degree of tilt in a programmatic automated fashion. The wheelchair is programmed or programmable to vary the degree of tilt, and therefore the wheelchair's occupant, automatedly. The wheelchair may provide pre-set ranges of seating angles and durations of time at each angle of tilt. The wheelchair thereby allows for reliable off-loading of the occupant's weight from pressure points, to avoid pressure ulcers, and does so programmatically so as to reduce the burden on healthcare staff and professionals while also ensuring adherence with prescribed tilting schedules.

18 Claims, 6 Drawing Sheets

(56) References Cited

U.S. PATENT DOCUMENTS

| | | | |
|---|---|---|---|
| 4,515,337 A | 5/1985 | Torras | |
| 6,126,186 A * | 10/2000 | Mascari | A61G 5/1081 |
| | | | 280/220 |
| 6,154,690 A | 11/2000 | Coleman | |
| 6,206,393 B1 | 3/2001 | Mascari | |
| 7,007,965 B2 | 3/2006 | Bernatsky | |
| 7,090,240 B2 | 8/2006 | Papac | |
| 7,185,910 B2 | 3/2007 | Beauchesne | |
| 7,614,699 B2 * | 11/2009 | Torres | B60N 2/39 |
| | | | 297/344.14 |
| 7,850,238 B2 | 12/2010 | Erb | |
| 9,010,787 B2 | 4/2015 | Slagerman | |
| 9,756,911 B2 | 9/2017 | Fitzgerald | |
| 9,824,573 B1 * | 11/2017 | Beres | A47C 7/723 |
| 9,987,179 B2 | 6/2018 | Melgarejo | |
| 10,130,533 B2 | 11/2018 | Schneider | |
| 10,207,728 B2 | 2/2019 | Kaushansky, deceased et al. | |
| 10,238,556 B1 | 3/2019 | Slagerman | |
| 2004/0094936 A1 | 5/2004 | Koerlin | |
| 2004/0222611 A1 | 11/2004 | Fenwick | |
| 2005/0279540 A1 | 12/2005 | Wisner | |
| 2012/0016484 A1 | 1/2012 | Link | |
| 2018/0085276 A1 | 3/2018 | Brodard | |
| 2018/0185215 A1 | 7/2018 | Brown | |
| 2018/0296794 A1 | 10/2018 | Clark | |
| 2019/0167498 A1 | 6/2019 | Parker | |

OTHER PUBLICATIONS

Invacare Solara 3G Tilt-in-space wheelchair product pamphlet, Sep. 2019, downloaded from <www.invacare.com/cgi-bin/imhqprd/inv_catalog/literature_search.jsp?s=0&doSearch=true&productID=SOLARA3G#SHOWRESULTS>.

S. Hoermann et al., "Computerized mirror therapy with augmented reflection technology for stroke rehabilitation: A feasibility study in a rehabilitation center," 2015 International Conference on Virtual Rehabilitation (ICVR), Valencia, 2015, pp. 199-206, doi: 10.1109/ICVR.2015.7358575. (Abstract only).

* cited by examiner

WHEELCHAIR WITH DYNAMIC OCCUPANT-TILT FEATURE

CROSS-REFERENCE TO RELATED APPLICATION

The present invention is a continuation of U.S. application Ser. No. 17/037,014, filed Sep. 29, 2020, now U.S. Pat. No. 11,712,382, which claims the benefit of priority, under 35 U.S.C. § 119(e), of U.S. Provisional Patent Application No. 62/908,992 filed Oct. 1, 2019, the entire disclosure of each of which is hereby incorporated herein by reference.

FIELD OF THE INVENTION

The present invention relates generally to wheelchairs having a support assembly capable of supporting an occupant at various degrees of tilt, and more particularly to a wheelchair having a tiltable support assembly, a powered drive system for adjusting the degree of tilt, and a control system for varying the degree of tilt in a programmatic automated fashion.

BACKGROUND

Wheelchairs are an essential means of mobility permitting an occupant to perform common activities that would otherwise be difficult, if not impossible, such as navigating about one's own home, tending to outdoor chores or pleasures, attending public gatherings, shopping at a physical store location, joining family and friends, and simply escaping the confines of one's own home. Wheelchairs are also commonly used in nursing home and hospital settings for persons with compromised motor functions.

Simple manual wheelchairs have a stationary support assembly for supporting an occupant that essentially includes a fixed-position seat portion and backrest portion that is either fixed in a position at a fixed 90-degree angle relative to the seat portion, or pivotable rearwardly to place the occupant in a reclined position while the seat remains stationary.

More expensive wheelchairs have an occupant-support assembly capable of supporting an occupant at various degrees of tilt, in which the seat and back portions both move in coordinated fashion. Exemplary conventional tilting wheelchairs consist of a seat frame that is pivotally mounted to a base frame so that the seat frame tilts to reposition the wheelchair occupant. The pivot axis is typically mounted between the base frame and seat frame, towards the rear of the seat and away from the occupant's center of gravity. Tilting the occupant involves lifting or lowering his or her center of gravity and therefore requires effort on the part of the attendant. Mechanisms, such as springs or gas cylinders, are often employed to assist in tilting the occupant. Typically, levers are attached to handles on a tilting wheelchair. The levers allow an attendant to release a locking mechanism, change the tilt angle by pushing or pulling on the handles, and engage the locking mechanism, which fixes the tilt angle.

Some of tilting wheelchairs are referred to as tilt-in-space wheelchairs. Such tilt-in-space wheelchairs typically have a sledding or hinge mechanism that tilts both the back and seat of the chair as a unit. A center-of-gravity tilt-in-space wheelchair has a seat assembly supported relative to a base by a rocker that has a curvature, the focal point of which is coincident with the center of gravity of the wheelchair occupant so that the center of gravity of the wheelchair occupant remains at a fixed location during tilting.

Tilting and tilt-in-space wheelchairs are well known. Such wheelchairs are typically used in nursing home and hospital setting and/or otherwise for highly-dependent or geriatric care. In these contexts, it is important to be able to reposition the occupant in various angular positions to relieve pressure to the wheelchair occupant's ischial tuberosities (i.e., the bony prominence of the buttocks) and sacral region, so that decubitus ulcers (i.e., pressure sores) can be avoided. Avoidance of pressure ulcers is particularly important as it can lead to secondary issues of infection, pain, deformity, and potentially death. Pressure ulcer formation also suggests possible negligence in care as such pressure sores can often be avoided with proper attention and care.

To avoid such pressures sores, nursing staff or other healthcare professionals in hospital or other care settings are often responsible for manually adjusting each wheelchair of each patient to vary the angular positions of the occupants to avoid such pressure ulcers.

Many tilt-in-space wheelchairs are manually operated, and do not include a powered drive system for adjusting the degree of tilt. Accordingly, a wheelchair attendant/operator must manipulate the wheelchair to manually release a position-locking mechanism, manually reposition the occupant/support structure, and then manually engage a position-locking mechanism. Some tilt-in-space wheelchairs include a powered drive system for adjusting the degree of tilt. However, even wheelchairs with such drive systems are manually operated in that they require either the occupant or an attendant/operator to manually provide control inputs (e.g., by pressing and holding an "increase tilt" button, "decrease tilt" button, or similar button until a desired degree of tilt has been determined by the occupant or attendant/operator to have been reached) at the time that the change in tilt is desired to be made. Accordingly, both such powered and unpowered tilt-in-space wheelchairs are manually adjustable. Accordingly, nursing staff or other healthcare professionals must be physically present at each patient's wheelchair in compliance with the prescribed schedule in order to manually adjust the degree of tilt to avoid pressure ulcers. As will be appreciated, it may be difficult for such staff and professionals to adhere to the necessary schedules in view of other demands for their time and attention, and further, any time spent by such staff/professionals to adjust the wheelchairs makes the staff/professionals unavailable or performing other important care tasks.

What is needed is a wheelchair having a tiltable support assembly, a powered drive system for adjusting the degree of tilt, and a control system for varying the degree of tilt, over time, in a programmatic automated fashion, so as to reduce the burden on healthcare staff and professionals while also ensuring adherence with prescribed tilting schedules.

SUMMARY

The present invention provides a wheelchair having a tiltable support assembly, a powered drive system for adjusting the degree of tilt and a control system for varying the degree of tilt, over time, in a programmatic automated fashion, so as to reduce the burden on healthcare staff and professionals while also ensuring adherence with prescribed tilting schedules.

A wheelchair in accordance with the present invention comprises: a base; a plurality of wheels mounted on said base and adapted to support said base relative to a support surface; a seat for receiving a wheelchair occupant; a support assembly supporting said seat on said base assembly and allowing for movement of said seat (or at least a portion of said seat), relative to said base, between an upright position, a fully-tilted position and a plurality of intermediate positions between said upright position and said fully-tilted position; a drive assembly operable to drive said support assembly to selectively adjust a position of said seat relative to said base; a power source for powering said drive assembly; and a control unit operable to cause said power source to power said drive assembly to vary the position of said seat relative to said base over time in programmatic fashion.

BRIEF DESCRIPTION OF THE FIGURES

An understanding of the following description will be facilitated by reference to the attached drawings, in which.

DETAILED DESCRIPTION

The present invention provides a wheelchair having a tiltable support assembly, a powered drive system for adjusting the degree of tilt, and a control system for varying the degree of tilt in programmatic fashion, so as to reduce the burden on healthcare staff and professionals while also ensuring adherence with prescribed tilting schedules.

Figure 1:
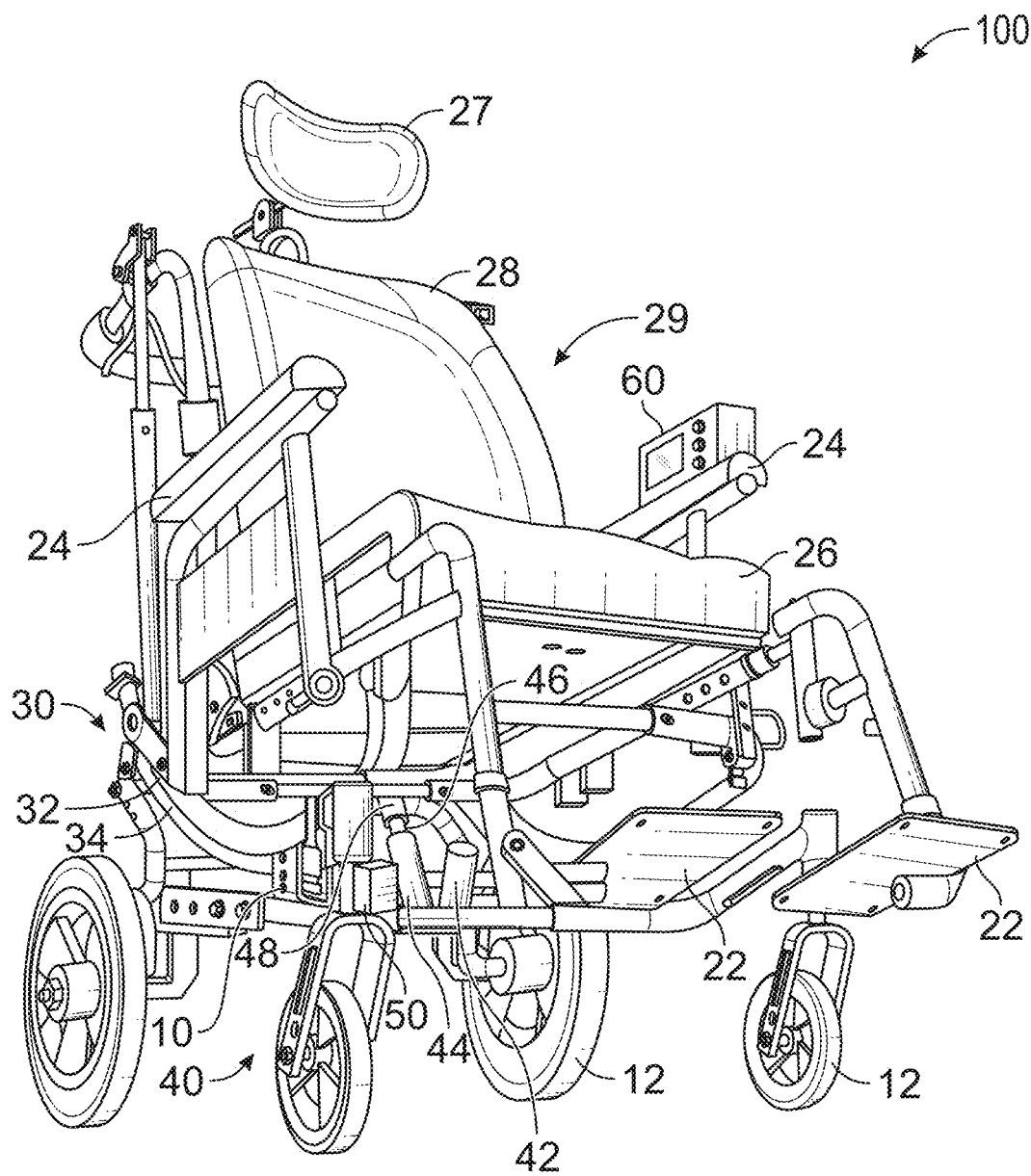
FIG. 1 is a right perspective view of a wheelchair with dynamic tilt control in accordance with an exemplary embodiment of the present invention.
Figure 2:
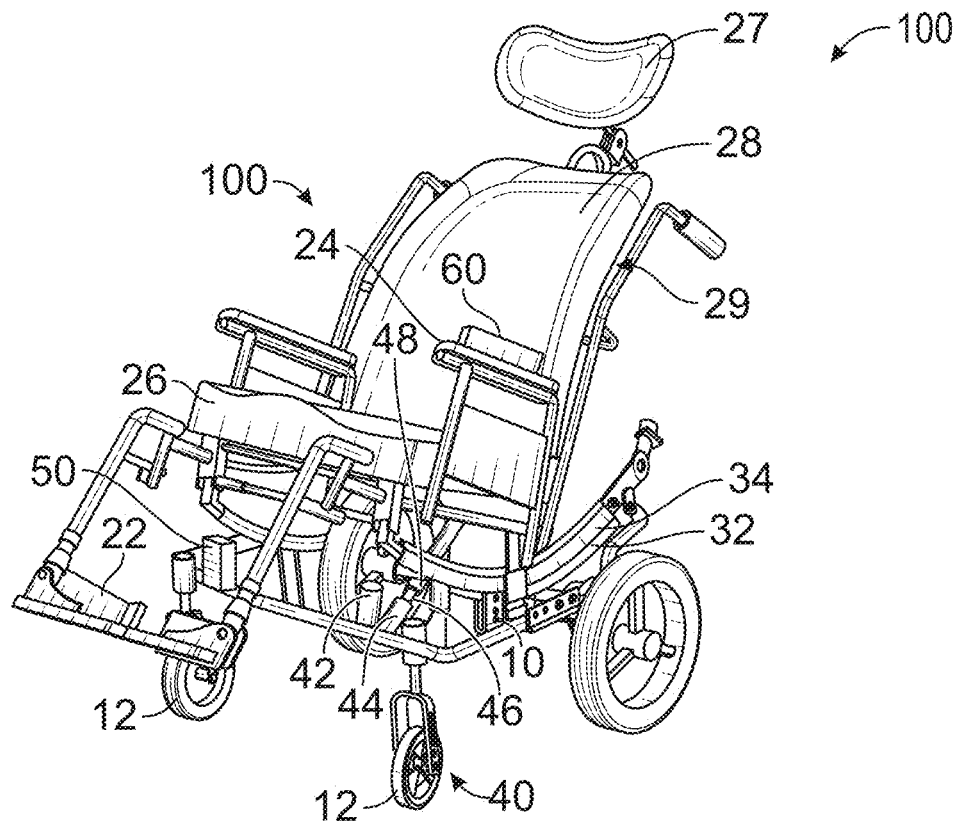
FIG. 2 is a left perspective of the wheelchair of FIG. 1.
Figure 3:
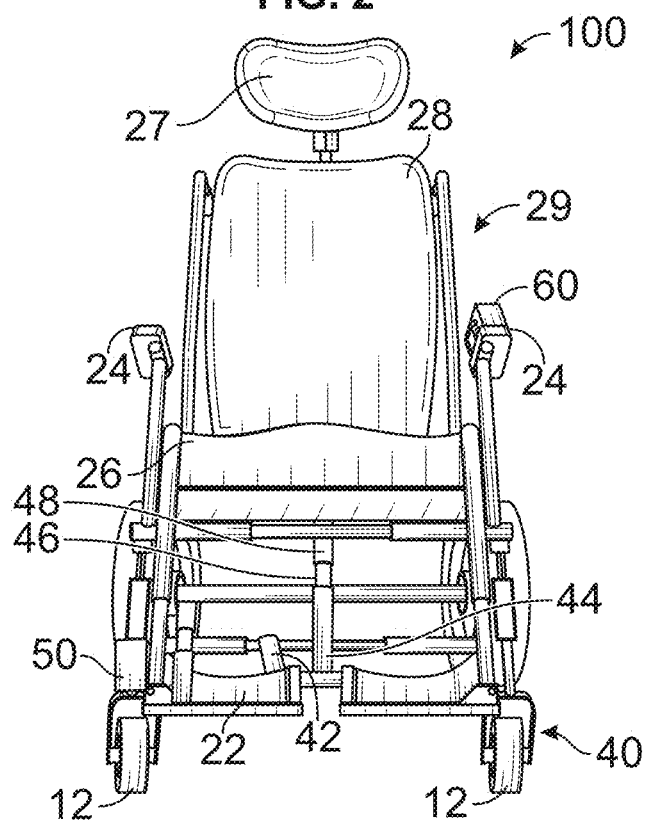
FIG. 3 is a front perspective of the wheelchair of FIG. 1.

Referring now to FIGS. 1-3, an exemplary 100 wheelchair with dynamic tilt control in accordance with an exemplary embodiment of the present invention is shown. The exemplary wheelchair is a tilt-in-space style wheelchair, having a particular support assembly structure for providing the tilt-in-space functionality. However, it will be appreciated that such structures are shown herein for illustrative purposes only, and that any tilt-in-space style wheelchair having any tiltable support assembly may be used within the scope of the present invention. It will be further appreciated that other styles of tiltable wheelchairs, not just tilt-in-space style wheelchairs, may be used within the scope of the present invention.

Referring again to FIGS. 1-3, as is typical of conventional tiltable wheelchairs, the exemplary wheelchair 100 includes a base 10 in the nature of a frame forming supportive structure for the wheelchair. The wheelchair further has a plurality of wheels 12 mounted on the base 10 and adapted to support the base 10 for rolling motion relative to a support surface, such as a flooring surface (not shown). The wheels may be unpowered, as shown, or may be powered and drive by a battery and electric motor, as known in the art. Further, as is typical of conventional wheelchairs, the wheelchair further includes a pair of footplates 22 and a pair of armrests 24. The wheelchair further includes a seat 26, a backrest 28, and optionally, a headrest 27 (collectively forming a seat 29 for receiving a wheelchair occupant).

As is typical of conventional tiltable wheelchairs, the wheelchair 100 further includes a seat tilting mechanism in the nature of a support assembly 30 supporting the seat 29 on the base 10 and allowing for movement of said seat 29 relative to the base 10. The support assembly 30 permits the seat to be pivoted/tilted between an upright position and a fully-tilted position, and to a plurality of intermediate positions between the upright and fully-tilted positions. In this exemplary embodiment, the support assembly 30 includes arcuate tiltable sled members 32 that are supported on/ride on complementary arcuate rail members supported on the base 10, such that the support assembly allows for tilting of the entire seat 29 relative to the base 10. However, any suitable support assembly structure may be used.

In accordance with the present invention, the wheelchair further includes a drive assembly 40 operable to drive the support assembly to selectively adjust a position of the seat relative to the base, and a power source 50 for powering the drive assembly 40. More particularly, the drive assembly is operable to adjust an angle of tilt of the seat 29 relative to the base 10. Accordingly, an attendant or nurse is not required to be physically present at the wheelchair 100 to apply force so as to adjust the degree of tilt of the seat 29, and thus the wheelchair occupant. Rather, the drive assembly 40 and power source 50 of the wheelchair itself collectively provide the required force for adjusting the degree of tilt. The drive assembly is controllable to vary the degree of tilt over time, e.g., continuously, or to allow for one or more particular dwell times at one or more positions of tilt.

Any suitable drive assembly 40 and power source 50 may be used for mechanically driving the support assembly 30 to adjust the angle of the seat. By way of example, the power source 50 may be a battery mounted on the wheelchair 100. By way of example, the drive assembly 40 may include a battery-powered hydraulic pump 42 driving a hydraulic cylinder 44 pivotably mounted to the base 10 (or alternatively, the support assembly 30) and having a hydraulic piston 46 joined to the support assembly 30 (or alternatively, the base 10), e.g. via a mount and pivot pin 48, as shown in FIGS. 1-3. Accordingly, operation of the pump 42 to extend the piston 46 adjusts the tilt of the seat 29 toward the upright position, and operation of the pump 42 to retract the piston 46 adjust the tilt of the seat 29 toward the fully-tilted position.

Figure 4:
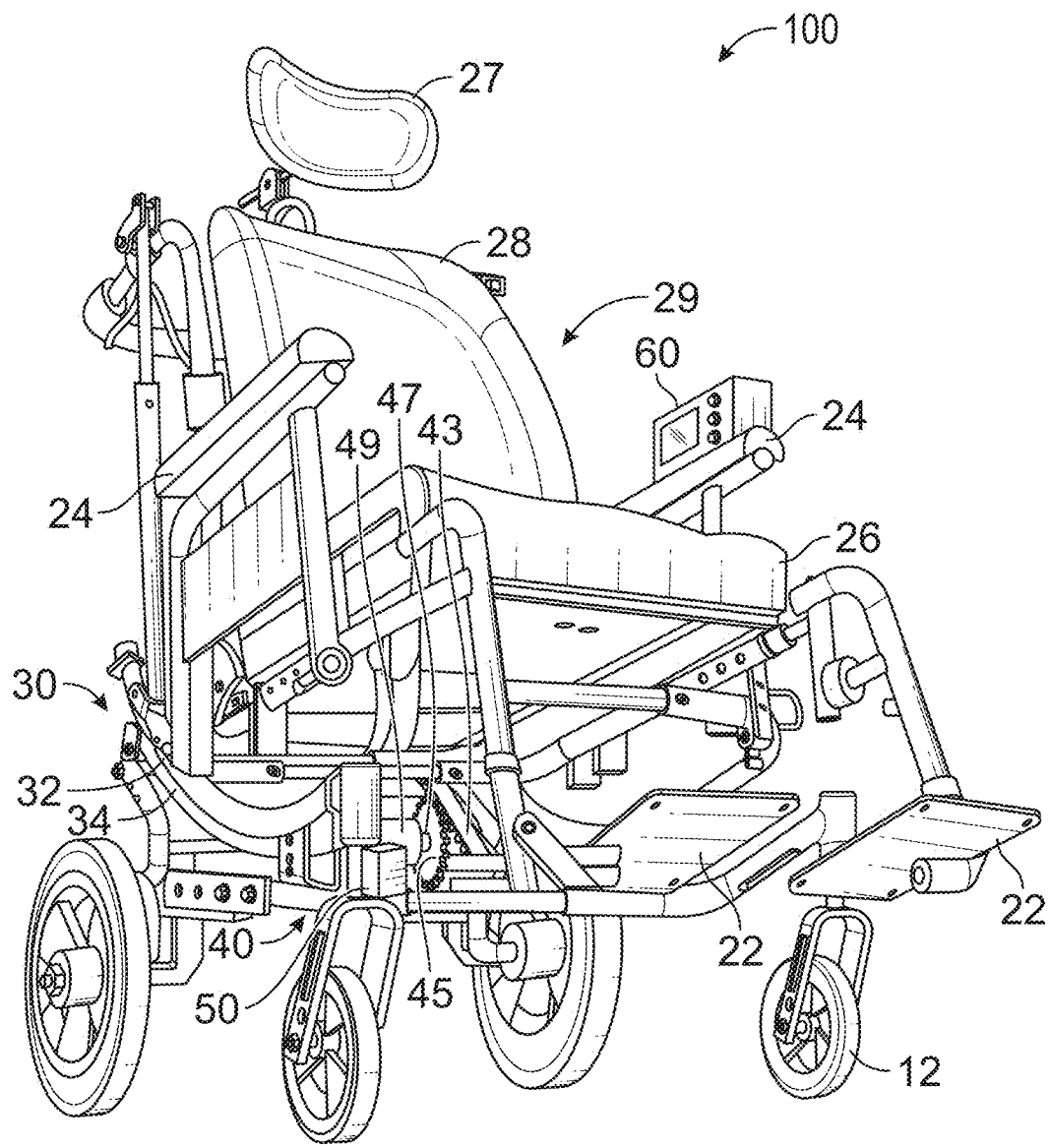
FIG. 4 is a right perspective view of an alternative embodiment of a wheelchair with dynamic tilt control in accordance with the present invention.

By way alternative example, the drive assembly 40 may include a toothed track or rack 43 mounted on one or both of the sleds 32 or otherwise attached to the seat support structure and driven by a drive gear 45 mechanically driven directly or through a gear train by a drive shaft 47 of an electric motor 49 mounted on the wheelchair, as shown in FIG. 4. Accordingly, the motor 49 may be operated to drive the drive gear 45 in a first direction to move the rack 43 in a first direction to adjust the tilt of the seat 29 toward the upright position, and further the motor 49 may be operated to drive the drive gear 45 in an opposite direction to move the rack in an opposite direction to adjust the tilt of the seat 29 toward the fully-tilted position.

Figure 5:
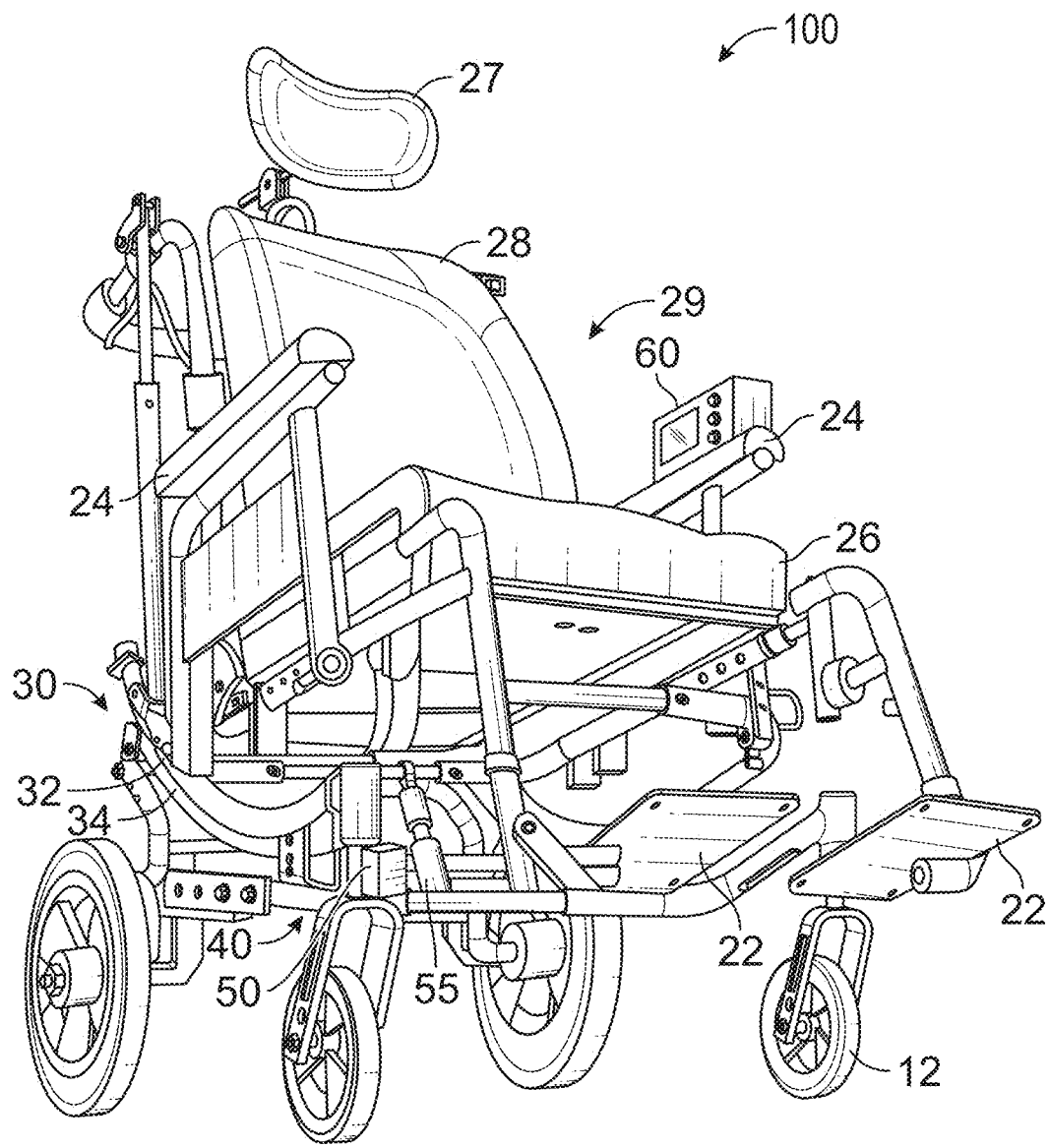
FIG. 5 is a right perspective view of another alternative embodiment of a wheelchair with dynamic tilt control in accordance with the present invention.

By way of another example, the drive assembly 40 may include one or more of an extensible/retractable electric actuator, linear electric actuators, electric ram, electric lift ram, electric lift cylinders (collectively referred to herein as a "linear actuator" 55) in lieu of the hydraulic-pump based arrangement described above, as shown in FIG. 5. The linear actuator 55 may be similarly mounted via a mount and pivot pin to the seat's support structure and to the base, such that operation to extend the linear actuator 55 adjusts the tilt of the seat 29 toward the upright position, and operation to retract the linear actuator 55 adjust the tilt of the seat 29 toward the fully-tilted position.

In accordance with the present invention, the wheelchair further includes a control unit 60 operable to cause the power source 50 to power the drive assembly 40 to vary the position of the seat 29 relative to the base 10. Although some conventional powered wheelchairs may have a drive assembly and power source and some form of controls for adjusting the tilt of the wheelchair in a powered fashion, the control unit 60 of the present invention is unlike prior art controls in that it is specially configured to vary the tilt of the seat over time in programmatic fashion. Accordingly, in contrast to a control system that simply responds to real-time (synchronous) increase-tilt or decrease-tilt inputs provided by an occupant or attendant, the control unit 60 of the present invention allows for asynchronous control. More particularly, the occupant or attendant may select a tilt-routine program, or tilt parameters/variables for controlling how the seat will be tilted over time, and then the tilting of the seat over time will be subsequently effected without further tilt-adjustment inputs from the occupant or attendant in synchronicity with the time at which adjustments may be made. This frees the occupant or attendant from having to provide tilt inputs at critical times, and frees the attendant from a need to be physically present at the wheelchair to make/input tilt adjustments over time, while still providing the seat/occupant with tilt adjustments over time.

For example, the control unit can be configured to provide predetermined seat angles for predetermined durations for a period of time. In an exemplary embodiment, the control unit 60 and/or remote control unit 90 provides an interface by which the wheelchair can be programed with seat angle and duration settings in increments e.g., 10 minute increments up to two hours and/or 5 degree increments from 30 degrees (tilted back) to 90 degrees (upright). For example, the control unit may be programmed, or programmable, to operate the drive assembly 40 to adjust the support assembly 30/seat 29 to an initial sitting angle of 50 degrees (e.g., full tilt) and to retain the seat 29 in that position for a duration of 15 minutes, then to operate the drive assembly 40 to adjust the support assembly 30/seat 29 to a next sitting angle of 35 degrees angle (less tilt), and to retain the seat 29 in this position for a duration of 15 minutes. The control unit 60 may then be configured to operate the drive assembly 40 to return the seat to the full tilt position for another 15 minutes, then return the seat to the "less tilt" position for another 15 minutes, then return the seat to a fully-upright, so as to vary the angle of tilt programmatically over a 1-hour period in response to a one-time asynchronous input provided at or before the 1-hour period, while allow for multiple adjustments of the seat during the 1-hour period. Any suitable routine/program/combination of tilt angles, durations, etc. may be used, with the goal of relieving pressure on the wheelchair occupant's body that would be likely to cause pressure sores.

By way of example, the control unit 60 may include a controller, such as a processor, microprocessor, programmable logic controller, and/or other electronics including a memory for storing inputs, predetermined logic, predetermined seat adjustment programs/routines, or menus of options of parameters for creating a seat adjustment program/routine (e.g., selectable angle and duration options), and an interface unit, such as a keypad, touchscreen or other device for receiving user input and/or displaying seat adjustment routine parameters. Any suitable combination of hardware and software may be used to provide a control unit 60 configured or user-configurable to provide for adjustment of tilt of the seat over time in programmatic fashion, as will be appreciated by those skilled in the art.

In one embodiment, as shown in FIGS. 1-4, the control unit 60 includes a keypad or other controls mounted on the wheelchair. In this embodiment, the wheelchair may be entirely self-contained, and the occupant or a nurse/attendant may provide inputs to the control unit at the wheelchair that will cause the intended programmatic adjustment of the seat over time.

In certain embodiments, the control unit 60 may track time within a programmatic tilt routine and display information indicating elapsed time of the tilt routine, elapsed time at a particular angle, and/or durations of tilt at one or more than one tilt angle. For example, the information may indicate that a particular patient completed a tilt cycle between angles of 30 degrees to 60 degrees, for a total of 45 minutes (or at 10-degree increments from 30-60 degrees with 45 minutes at each angel) with no complaints or pressure areas noted. In certain embodiments, the control unit 60 may cause such information to be displayed via a display device at the control unit 60. In other embodiments, the control unit 60 may cause such information to be displayed at a device remote from the control unit, e.g., by communicating such data to another device for display remotely. Such information could be reviewed by a caregiver to determine, for example, a progression in the patient's tolerance at certain angles and times, over the course of a set period. Any patient complaints, or a lack of complaints, could be used as feedback by the caregiver to revise the patient's tilt routine from session to session, over time. For example, in a first week, duration time may be limited to 1 hour at each tilt angle, but without complaints, in a following week, the caregiver may configure a revised programmatic tilt routine providing a duration time of 2 hours, at each tilt angle.

Figure 6:
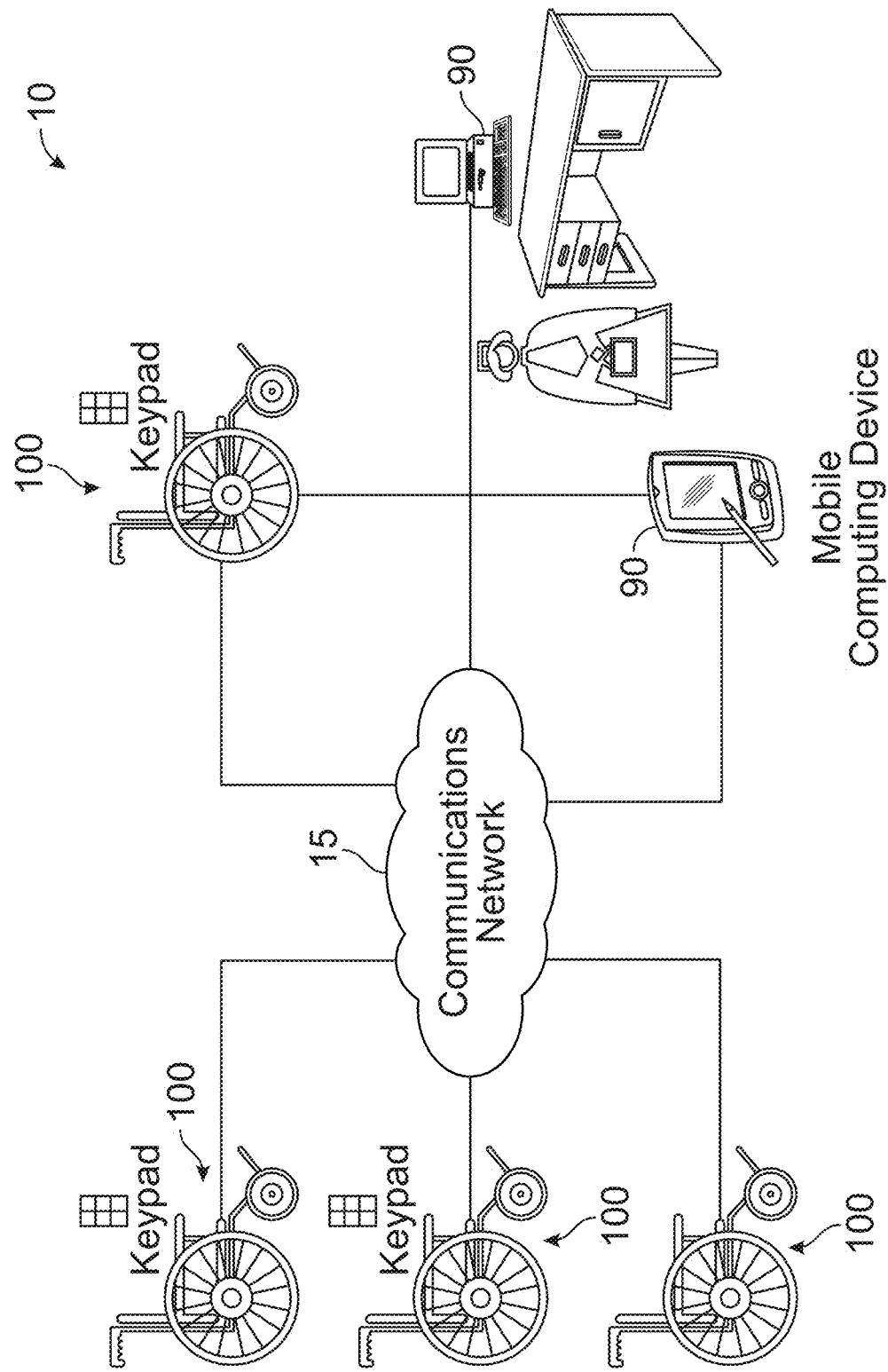
FIG. 6 is a system diagram showing an exemplary network computing environment in which the present invention may be employed.
Figure 7:
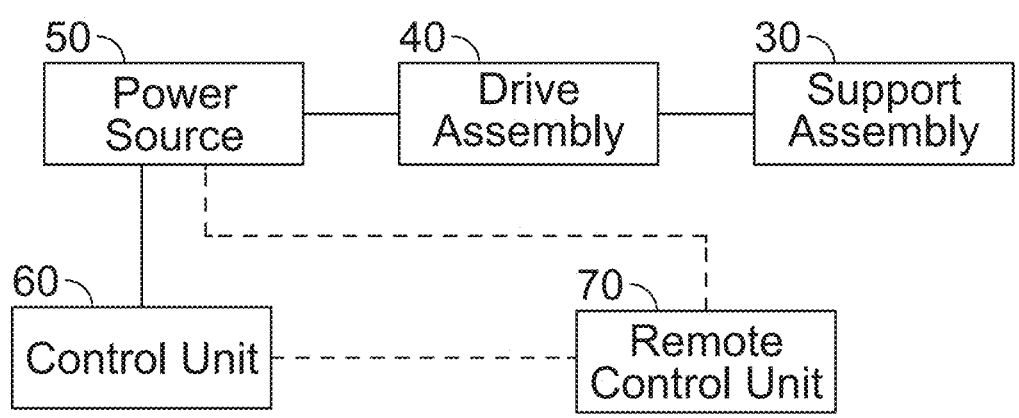
FIG. 7 is a schematic diagram of an exemplary wheelchair with dynamic tilt control in accordance with an exemplary embodiment of the present invention.

In another exemplary embodiment, as shown in FIGS. 6 and 7, the wheelchair 100 may or may not include a keypad or other input device at the wheelchair, but rather may be part of a system that further includes a remote control unit 90. In such an embodiment, some or all of the hardware, software and functionality of the control unit 60 described above may be incorporated into the remote control unit 90. For example, the remote control unit 90 may allow for input to the control unit 60 to cause the control unit 60 to cause the seat to be adjusted programmatically. Alternatively, the remote control unit 90 may sent instructions directly to the power source 50 without communicating directly to control unit 60 so that the remote control unit 90 directly controls the power source 50 instead of the control unit 60.

In certain embodiments, the remote control unit 90 may be a special-purpose device designed to be interoperable exclusively with the wheelchair 100. In other embodiments, the remote control unit 90 may include general-purpose hardware and software, such as that of a smartphone device or a personal computer, and may include an app or other software allowing for such device to be used to provide inputs to the wheelchair for controlling the tilt of the seat programmatically. In certain embodiments, the remote control unit 90 may be configured to communicate directly with the wheelchair 100/control unit 60 via Bluetooth or other short-range wireless communication technologies. In other embodiments, the remote control unit 90 may be configured to communicate in wired or wireless fashion via an intranet, the Internet or another communications network to the wheelchair, e.g., via WiFi technologies. Accordingly, it will be appreciated, for example, that a single nurse at a centralized nursing station may be able to program/provide instructions to many wheelchairs (and/or monitor the tilting routines, including tilt angles and corresponding duration times, of those wheelchairs) in a nursing unit from a single location, without having to be present at each individual wheelchair. Further, for example, one or more nurses may be able to use their smartphone or tablet-type mobile devices to program/providing instructions to one or more wheelchairs while "on the floor" and moving about the nursing unit.

In certain embodiments, after a programmatic tilt cycle has been completed, a notification is provided. By way of example, the notification may be provided at the wheelchair, e.g., by producing a vibration or audible sound or visual indicator (e.g., illumination of a light, or display of an image on a display) via a vibration motor, loudspeaker, light or video display mounted on the wheelchair. Alternatively or additionally, the notification may be provided at the remote control unit 90, e.g. after the control unit has transmitted a corresponding signal to the remote control unit 90 over the communications network 15, e.g., by causing production of a vibration or audible sound or visual indicator at the remote control unit 90.

In certain embodiments, the control unit/wheelchair and/or the remote control unit 90 are configured to receiving input allowing the occupant and/or caregiver/nurse/attendant to initiate a manual mode of operation, to override the programmatic tilt cycle, or to provide for additional tilt adjustments after a programmatic tilt cycle has been completed (e.g., in response to a notification indicating that the tilt cycle has been completed). For example, instructions may be input via the keypad at on the wheelchair or via a user interface of the remote control unit 90.

In certain embodiments, the control unit 60 and/or wheelchair 100 may include an emergency STOP feature with a button or other user-input device directly on the wheelchair (e.g., located at or near the underside of an armrest) so as to be operable by the occupant or attendant, for safety purposes.

Accordingly, the present invention provides a programmable tilting wheelchair providing pre-set ranges of seating angles and duration of time at each angle, which is capable of satisfying an operational issue reported by end users (typically Nursing) in the hospital setting, namely, nursing and therapy staff has difficulties reliably recalling, or being available to complete, the next tilt adjustment at the appropriate prescribed times needed for optimal occupant off-loading/tilting, which results in occupants being "stuck" at a particular angle for periods that are too long, adding to soft tissue injury risk. The wheelchair of the present invention allows a slow, gentle change of position (either continuously, or in stages of one or more durations at one or more tilt angles), supervised by a facility caregiver (e.g., Occupational Therapist or RN staff) to reliably and safely provide pressure relief.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A wheelchair comprising:
   a base;
   a plurality of wheels mounted on said base and adapted to support said base relative to a support surface;
   a seat for receiving a wheelchair occupant, said seat comprising a seat portion and a backrest portion joined to said seat portion in a fixed position relative to said seat portion;
   a support assembly supporting said seat on said base and allowing for movement of said seat, relative to said base, between an upright seat position, a fully-tilted seat position and a plurality of intermediate seat positions between said upright seat position and said fully-tilted seat position;
   a drive assembly operable to drive said support assembly to selectively adjust a position of said at least a portion of said seat relative to said base;
   a power source for powering said drive assembly; and
   a control unit operable to cause said power source to power said drive assembly to dynamically vary a tilt position of said seat relative to said base over time automatedly, in a predefined programmatic fashion, to implement an occupant tilting routine for avoiding pressure ulcer formation on the wheelchair's occupant according to user input provided asynchronously with tilting of said seat.

2. The wheelchair of claim 1, wherein said wheelchair is a tilt-in-space style wheelchair.

3. The wheelchair of claim 1, wherein said support assembly comprises a pair of arcuate sled members supported on a corresponding pair of arcuate rail members supported on said base.

4. The wheelchair of claim 1, wherein said power source comprises a battery supported on said base and said drive assembly comprises a battery-powered linear actuator joined at its ends to said base and said support assembly.

5. The wheelchair of claim 1, wherein said control unit is computerized and is programmed to receive user inputs for asynchronous control of a position of said seat relative to said base.

6. The wheelchair of claim 1, wherein said control unit is pre-configured with a plurality of seat-tilting programs, and is configured to provide an interface allowing a user to select at least one of said plurality of seat-tilting programs.

7. The wheelchair of claim 1, wherein said control unit is pre-configured with a plurality of seat-tilting programs configurable according to user input, and is configured to provide an interface allowing a user to provide user input to configured at least one of said plurality of seat-tilting programs.

8. The wheelchair of claim 1, wherein said control unit is configured to provide an interface allowing a user to provide user input for parameters of a seat-tilting routine.

9. The wheelchair of claim 8, wherein said control unit is configured to provide an interface allowing a user to provide user input as at least one of a seat angle and a duration of time at said seat angle.

10. The wheelchair of claim 1, wherein said control unit is mounted to said wheelchair.

11. The wheelchair of claim 1, wherein said control unit comprises a remote control unit that is not mounted to said wheelchair, but that is in data communication with a portion of said control unit mounted to said wheelchair.

12. A wheelchair comprising:

a base;

a plurality of wheels mounted on said base and adapted to support said base relative to a support surface;

a seat for receiving a wheelchair occupant;

a support assembly supporting said seat on said base and allowing for movement of at least a portion of said seat, relative to said base, between an upright seat position, a fully-tilted seat position and a plurality of intermediate seat positions between said upright seat position and said fully-tilted seat position;

a drive assembly operable to drive said support assembly to selectively adjust a position of said at least a portion of said seat relative to said base;

a power source for powering said drive assembly, said power source comprising a battery supported on said base; and a control unit operable to cause said power source to power said drive assembly to vary the position of said seat relative to said base over time automatedly, in a predefined programmatic fashion;

wherein said drive assembly comprises:

a battery-powered hydraulic pump operatively coupled to said power source and supported on said base; and a hydraulic cylinder comprising a hydraulic piston, an end of said hydraulic cylinder being joined to one of said base and said support assembly, and a respective end of said hydraulic piston being joined to another of said base and said support assembly, said hydraulic cylinder being operatively connected to said hydraulic pump to selective cause extension and retraction of said piston relative to said cylinder.

13. The wheelchair of claim 12, wherein each of said hydraulic cylinder end and said hydraulic piston end are joined to a respective one of said support assembly and said base by a respective mount and pivot pin.

14. A wheelchair comprising:

a base;

a plurality of wheels mounted on said base and adapted to support said base relative to a support surface;

a seat for receiving a wheelchair occupant;

a support assembly supporting said seat on said base and allowing for movement of at least a portion of said seat, relative to said base, between an upright seat position, a fully-tilted seat position and a plurality of intermediate seat positions between said upright seat position and said fully-tilted seat position;

a drive assembly operable to drive said support assembly to selectively adjust a position of said at least a portion of said seat relative to said base;

a power source for powering said drive assembly, said power source comprising a battery supported on said base; and a control unit operable to cause said power source to power said drive assembly to vary the position of said seat relative to said base over time automatedly, in a predefined programmatic fashion;

wherein said drive assembly comprises:

a toothed rack mounted to one of said base and said support assembly;

a drive gear having teeth complementary to and positioned to register with teeth of said toothed rack; and an electric motor operatively connected to said power source and mechanically coupled to said drive gear.

15. The wheelchair of claim 14, wherein said drive gear is mounted on a drive shaft of said electric motor.

16. The wheelchair of claim 14, wherein said drive gear is mechanically coupled to said drive gear by a gear train driven by a drive shaft of said electric motor.

17. A wheelchair comprising:

a base;

a plurality of wheels mounted on said base and adapted to support said base relative to a support surface;

a seat for receiving a wheelchair occupant;

a support assembly supporting said seat on said base and allowing for movement of at least a portion of said seat, relative to said base, between an upright seat position, a fully-tilted seat position and a plurality of intermediate seat positions between said upright seat position and said fully-tilted seat position;

a drive assembly operable to drive said support assembly to selectively adjust a position of said at least a portion of said seat relative to said base;

a power source for powering said drive assembly; and a control unit operable to cause said power source to power said drive assembly to vary the position of said seat relative to said base over time automatedly, in programmatic fashion, according to a seat-tilting program stored in a memory of said control unit, said program specifying a duration of time for dwelling at each of a plurality of positions of said at least a portion of said seat relative to said base.

18. A wheelchair comprising:

a base;

a plurality of wheels mounted on said base and adapted to support said base relative to a support surface;

a seat for receiving a wheelchair occupant;

a support assembly supporting said seat on said base and allowing for movement of at least a portion of said seat, relative to said base, between an upright seat position, a fully-tilted seat position and a plurality of intermediate seat positions between said upright seat position and said fully-tilted seat position;

a drive assembly operable to drive said support assembly to selectively adjust a position of said at least a portion of said seat relative to said base;

a power source for powering said drive assembly; and a control unit operable to cause said power source to power said drive assembly to vary the position of said seat relative to said base over time automatedly, in programmatic fashion, to cause said portion of said seat to dwell in a first position for a first duration of time, and then to dwell in a second position for a second duration of time.

* * * * *